United States Patent
Castinado et al.

(10) Patent No.: US 10,936,741 B2
(45) Date of Patent: Mar. 2, 2021

(54) MANAGEMENT OF ACCESS TO DATA STORED ON A DISTRIBUTED LEDGER

(71) Applicant: BANK OF AMERICA CORPORATION, Charlotte, NC (US)

(72) Inventors: Joseph Benjamin Castinado, North Glenn, CO (US); Samuel Massa Moiyallah, Jr., Newark, DE (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 148 days.

(21) Appl. No.: 16/195,276

(22) Filed: Nov. 19, 2018

(65) Prior Publication Data

US 2020/0159946 A1    May 21, 2020

(51) Int. Cl.
*G06F 21/62*    (2013.01)
*H04L 29/06*    (2006.01)

(52) U.S. Cl.
CPC .......... *G06F 21/6218* (2013.01); *H04L 63/08* (2013.01); *H04L 63/10* (2013.01)

(58) Field of Classification Search
None
See application file for complete search history.

(56) References Cited

U.S. PATENT DOCUMENTS

| | | |
|---|---|---|
| 9,794,074 B2 | 10/2017 | Toll et al. |
| 9,858,781 B1 | 1/2018 | Campero et al. |
| 10,075,298 B2 * | 9/2018 | Struttmann ......... G06F 21/6218 |
| 10,129,269 B1 | 11/2018 | Ford |
| 10,135,609 B2 | 11/2018 | Bibera et al. |
| 2016/0098730 A1 | 4/2016 | Feeney |
| 2016/0261690 A1 | 9/2016 | Ford |
| 2016/0323109 A1 | 11/2016 | McCoy et al. |
| 2017/0111175 A1 | 4/2017 | Oberhauser et al. |
| 2017/0140375 A1 | 5/2017 | Kunstel |
| 2017/0177855 A1 | 6/2017 | Costa Faidella et al. |
| 2017/0213209 A1 | 7/2017 | Dillenberger |
| 2017/0279783 A1 * | 9/2017 | Milazzo .................. B29C 64/00 |
| 2017/0300898 A1 | 10/2017 | Campero et al. |
| 2018/0013940 A1 | 1/2018 | Sakaguchi |
| 2018/0082296 A1 | 3/2018 | Brashers |
| 2018/0101842 A1 | 4/2018 | Ventura et al. |
| 2018/0129955 A1 | 5/2018 | Saxena et al. |
| 2018/0218364 A1 | 8/2018 | Cantrell et al. |

(Continued)

*Primary Examiner* — Brandon S Hoffman
(74) *Attorney, Agent, or Firm* — Michael A. Springs; Moore & Van Allen PLLC; James C. Edwards

(57) ABSTRACT

Systems, computer program products, and methods are provided for categorizing data entries or segments from data files and storing the categorized data within category-specific blocks of a distributed ledger within a distributed trust computing network. Access credentials are generated that link/point to the those category-specific blocks containing data entries/segments that the credential holder is authorized to access. As such, the present invention insures that authorized entities (i.e., credential holders) that are accessing the distributed trust network for the purpose of verifying/authenticating data contained therein only have access to that portion/segment of the data file (e.g., specific data entries or the like) that they are authorized to access. In other words, the present invention, limits the authorized entity to only accessing data from the data file on a need-to-know basis.

18 Claims, 5 Drawing Sheets

(56) References Cited

U.S. PATENT DOCUMENTS

2018/0268386 A1    9/2018  Wack et al.
2018/0285996 A1*  10/2018  Ma ............................ H04L 9/12
2018/0341648 A1   11/2018  Kakavand et al.
2018/0349621 A1   12/2018  Schvey et al.

* cited by examiner

US 10,936,741 B2

MANAGEMENT OF ACCESS TO DATA STORED ON A DISTRIBUTED LEDGER

FIELD OF THE INVENTION

The present invention is generally directed to data storage in a distributed trust computing network and, more specifically, providing secure access to data stored in a distributed trust computing network, such as a blockchain network, through use of data file content categorization.

BACKGROUND

A distributed trust computing network is a distributed database that maintains a list of data records, or the like. The data records may include data files (documents, audio files, multimedia files or the like), which a user (data file holder/possessor) desires to store within the trust network as means of authenticating/verifying the original data file. The security of the data maintained within the distributed trust computing network is enhanced by the distributed nature of the network. The trust network typically includes several nodes, which may be one or more systems, machines, computers, databases, data stores or the like operably connected with one another. In some instances, each of the nodes or multiple nodes are maintained by different entities. A trust network typically works without a central repository or single administrator. One well-known application of a distributed computing trust network, otherwise referred to as a blockchain network, is the public ledger of transactions for cryptocurrencies such as used in bitcoin. The data records recorded in the trust network/block chain are enforced cryptographically and stored on the nodes of the block chain.

In other instances a distributed trust computing network may be used by entities/individuals to store data files that benefit from the authentication/verification provide by the distributed trust computing network (i.e., source of truth) and also have a need to be accessed by other entities/parties. For example, in an automotive transaction a buyer may desire to store a copy of their current vehicle's title on the block chain, loan application documentation, driver's license and the like. In this regard, different entities (i.e., car dealership, loan financer(s) and the like) may have a need to access different data files/documents that are stored in the distributed trust computing network. However, the different entities may have a need-to-know less than all of the data contained in a data/file. For example, one entity may need to know the loan amount but does not have a need to know other confidential, non-public information contained in a loan document/application or the like. In another example, the data file may be an audio file or a multimedia file and the entity/user that stores the audio or multimedia file may desire to control access to the file, such that certain entities may be provided access to the entire data file, while other entities may be provided access to only a portion of the data file (e.g., a clip or snippet).

Therefore a need exists to be able to provide for the storage of data files on a distributed trust computing network and control over the access to the data stored in the data files. In this regard, a need exists to allow a data file holder/possessor to not only control which data files that an authorized entity can access, but also control which segments/portions of the content (e.g., data entries or the like) within the data files that the authorized entity can access.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for storing data files within a distributed trust computing network, such as a blockchain network, which acts as source of truth for the digital copy and controlling the access to the data files on a per data file segment/data entry basis. As such, the present invention insures that authorized entities that are accessing a distributed trust network-stored data file for the purpose of verifying/authenticating data contained therein only have access to that portion/segment of the data file (e.g., specific data entries or the like) that they are authorized to access. In other words, the present invention, limits the authorized entity to only accessing data from the data file on a need-to-know basis.

Specifically, the present invention is able to automatically categorize content within a data file for the purpose of granting access to content on a per-category basis. Once the data has been categorized, the present invention provides for storing the data for a given data file within a block of the distributed ledger on a per-category or data-entry basis. In this regard, a block of the distributed ledger may store all of the data entries for a predetermined access category or, in alternate embodiments of the invention, a block of the distributed ledger may store a single data entry or a single segment/portion of the data file.

In response to storing the contents of the data file in different blocks of the distributed ledger, the present invention generates access credentials for a specified entity that are configured to grant an entity access to only those portions of the data file that the entity is authorized to access. In this regard, the access credentials are configured to provide pointers to the location of the blocks in the distributed ledger and the keys for accessing the blocks that are associated with categories of data or segments of the data file that the entity is authorized to access.

In response to presenting the access credentials, the present invention, accesses the blocks of the distributed ledger specified by the access credentials and retrieves the data entries and/or segments of the data file stored in the blocks. In specific embodiments of the invention, the retrieved data entries and/or segments of the data file are returned to the authorized accessor in a raw data file, while in other embodiments of the invention, the retrieved data entries and/or segments of the data file are compiled into a data file format prior to presenting the data entries and/or segments of the data file to the authorized entity. In such embodiments of the invention, compiling the data entries may include retrieving a data file template (e.g., document template) and populating the template with the retrieved data file entries. In this regard, the present invention creates a data file that only includes the data entries that the entity is authorized to access (i.e., a virtual redacted data file/document, in which, data entries that the entity is not authorized to access are either not included or hidden from the entity's view).

A system for providing access to data stored in a distributed trust computing network defines first embodiments of the invention. The system includes a distributed trust computing network comprising a plurality of decentralized nodes, each decentralized node having a first memory and at least one first processor in communication with the memory. The first memory of the decentralized nodes is configured to store at least one distributed ledger comprising a plurality of blocks that store data, wherein the distributed trust computing network is configured to certify that the data stored in the blocks is authentic and unaltered.

The system additionally includes a first computing platform disposed in a distributed computing network, in communication with the distributed trust computing network and including a second memory and at least one second processor in communication with the second memory. The second memory stores first instructions that are executable by the second processor and configured to receive a request to store an electronic data file within the distributed trust computing network and assign, one or more (i) data entries or (ii) segments of the data file, an access category from amongst a plurality of preconfigured access categories. The first instructions are further configured to store the one or more (i) data entries or (ii) segments of the data file within one or more of the blocks of the distributed ledgers, such that, each of the one or more blocks are designated to store (i) data entries or (ii) segments from one of the access categories. The first instructions are further configured to generate an access credential that is configured to provide a credential holder access to one or more of the (i) data entries or (ii) segments of the data file stored within the distributed ledger based on one or more of the access categories that the credential holder is authorized to access.

In specific embodiments of the system the first instructions are further configured to store each of the one or the one or more (i) data entries or (ii) segments of the data file assigned to one of the plurality of preconfigured access categories within one data file-specific and access category-specific block of the distributed ledger. In such embodiments of the system the first instructions are further configured to generate the access credentials that are configured to include a pointer that identifies a location within the distributed ledger of each data file-specific and access category-specific block that is associated with (i) the data file and (ii) an access category that the credential holder is authorized to access.

In other specific embodiments of the system the first instructions are further configured to store each of the one or the one or more (i) data entries or (ii) segments of the data file in a (i) data file-specific and (ii) data entry-specific or segment-specific block of the distributed ledger. In such embodiments of the system the first instructions are further configured to generate the access credentials that are configured to include a pointer that identifies a location within the distributed ledger of each of the data file-file specific and data entry-specific or segment-specific blocks that are associated with (i) the data file, and (ii) an access category that the credential holder is authorized to access.

In other specific embodiments of the system each of the plurality of preconfigured access categories are defined by a different level of security required of the data entries or segments assigned to the access category. Examples of access categories include, but are not limited to, public data, non-public data, confidential data, private data or the like.

In still further specific embodiments the system includes second instructions that are executable by the second processor and configured to receive the access credentials for accessing at least a portion of the data file stored within the distributed ledger, determine, from the access credentials, locations of one or more of the blocks of the distributed ledger that store one or one or more (i) data entries or (ii) segments of the data file that are assigned to one or more of the plurality of preconfigured access categories associated with the access credentials, and access the locations of the one or more blocks of the distributed ledger to retrieve the one or more (i) data entries or (ii) segments of the data file that are assigned to one or more of the plurality of preconfigured access categories associated with the access credentials. In such embodiments of the system, the second instructions may be further configured to compile the retrieved one or more (i) data entries or (ii) segments of the data file into at least a portion of the data file. In such embodiments of the system the second instructions may be further configured to compile the retrieved one or more data entries of the data file into at least a portion of the data file, such that, the least a portion of the data file comprises a redacted data file including only the data entries that the credential holder is authorized to access.

A computer-implemented method for providing access to data stored in a distributed trust computing network defines second embodiments of the invention. The computer-implemented method is implemented by one or more processing devices and includes receiving a request to store an electronic data file within the distributed trust computing network, and assigning, one or more (i) data entries or (ii) segments of the data file, an access category from amongst a plurality of preconfigured access categories. The method further includes storing the one or more (i) data entries or (ii) segments of the data file within one or more of the blocks of the distributed ledgers, wherein each of the one or more blocks are designated to store (i) data entries or (ii) segments from one of the access categories, and generating an access credential that is configured to provide a credential holder access to one or more of the (i) data entries or (ii) segments of the data file stored within the distributed ledger based on one or more of the access categories that the credential holder is authorized to access.

In specific embodiments of the method storing further includes storing each of the one or the one or more (i) data entries or (ii) segments of the data file assigned to one of the plurality of preconfigured access categories within one data file-specific and access category-specific block of the distributed ledger. In such embodiments of the method generating further includes generating the access credentials that are configured to include a pointer that identifies a location within the distributed ledger of each data file-specific and access category-specific block that is associated with (i) the data file and (ii) an access category that the credential holder is authorized to access.

In further specific embodiments of the method each of the plurality of preconfigured access categories are defined by different levels of security required of the data entries assigned to the access category. Examples of access categories include, but are not limited to, public data, non-public data, confidential data, private data or the like.

In still further specific embodiments the method further includes receiving the access credentials for accessing at least a portion of the data file stored within the distributed ledger, determining, from the access credentials, locations of one or more of the blocks of the distributed ledger that store one or one or more (i) data entries or (ii) segments of the data file that are assigned to one or more of the plurality of preconfigured access categories associated with the access credentials, and accessing the locations of the one or more blocks of the distributed ledger to retrieve the one or more (i) data entries or (ii) segments of the data file that are assigned to one or more of the plurality of preconfigured access categories associated with the access credentials. In such embodiments the method may further include compiling the retrieved one or more (i) data entries or (ii) segments of the data file into at least a portion of the data file. In specific embodiments of the method, the least a portion of the data file includes a redacted data file including only the data entries that the credential holder is authorized to access.

A computer program product including a non-transitory computer-readable medium defines third embodiments of the invention. The computer-readable medium includes a first set of codes for causing a computer to receive a request to store an electronic data file within the distributed trust computing network and a second set of codes for causing a computer to assign, one or more (i) data entries or (ii) segments of the data file, an access category from amongst a plurality of preconfigured access categories. The computer-readable medium additionally includes a third set of codes for causing a computer to store the one or more (i) data entries or (ii) segments of the data file within one or more of the blocks of the distributed ledgers. Each of the one or more blocks are designated to store (i) data entries or (ii) segments from one of the access categories, and a fourth set of codes for causing a computer to generate an access credential that is configured to provide a credential holder access to one or more of the (i) data entries or (ii) segments of the data file stored within the distributed ledger based on one or more of the access categories that the credential holder is authorized to access.

In other embodiments of the computer program product, the third set of codes is further configured to cause the computer to store each of the one or the one or more (i) data entries or (ii) segments of the data file assigned to one of the plurality of preconfigured access categories within one data file-specific and access category-specific block of the distributed ledger and the fourth set of codes is further configured to cause the computer to generate the access credentials that are configured to include a pointer that identifies a location within the distributed ledger of each data file-specific and access category-specific block that is associated with (i) the data file and (ii) an access category that the credential holder is authorized to access.

In specific embodiments of the computer program product the computer-readable medium further includes a fifth set of codes for causing a computer to receive the access credentials for accessing at least a portion of the data file stored within the distributed ledger and a sixth set of codes for causing a computer to determine, from the access credentials, locations of one or more of the blocks of the distributed ledger that store one or one or more (i) data entries or (ii) segments of the data file that are assigned to one or more of the plurality of preconfigured access categories associated with the access credentials. Additionally, the computer-readable medium includes a seventh set of codes for causing a computer to access the locations of the one or more blocks of the distributed ledger to retrieve the one or more (i) data entries or (ii) segments of the data file that are assigned to one or more of the plurality of preconfigured access categories associated with the access credentials, and an eighth set of codes for causing a computer to compile the retrieved one or more (i) data entries or (ii) segments of the data file into at least a portion of the data file. Moreover, in other related specific embodiments of the computer program product the eighth set of codes is further configured to compile the retrieved one or more data entries of the data file into at least a portion of the data file, wherein the least a portion of the data file comprises a redacted data file including only the data entries that the credential holder is authorized to access.

Thus, according to embodiments of the invention, which will be discussed in greater detail below, the present invention provides for categorizing data entries or segments from data files and storing the categorized data within category-specific blocks of a distributed ledger within a distributed trust computing network. Access credentials are generated that link/point to the those category-specific blocks containing data entries/segments that the credential holder is authorized to access. As such, the present invention insures that authorized entities (i.e., credential holders) that are accessing the distributed trust network for the purpose of verifying/authenticating data contained therein only have access to that portion/segment of the data file (e.g., specific data entries or the like) that they are authorized to access. In other words, the present invention, limits the authorized entity to only accessing data from the data file on a need-to-know basis.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
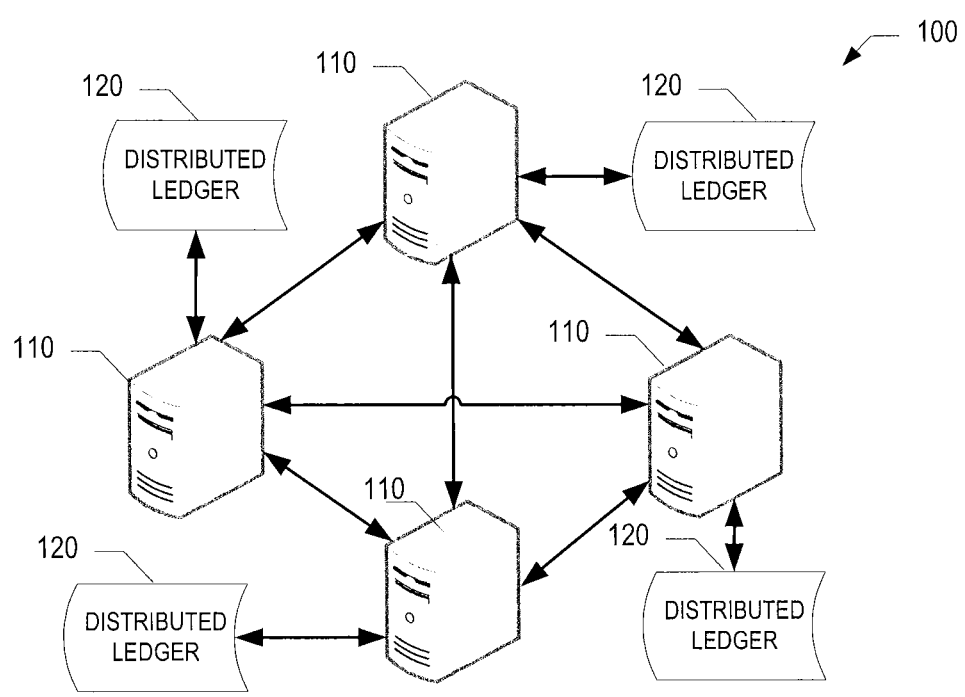
Figure 2:
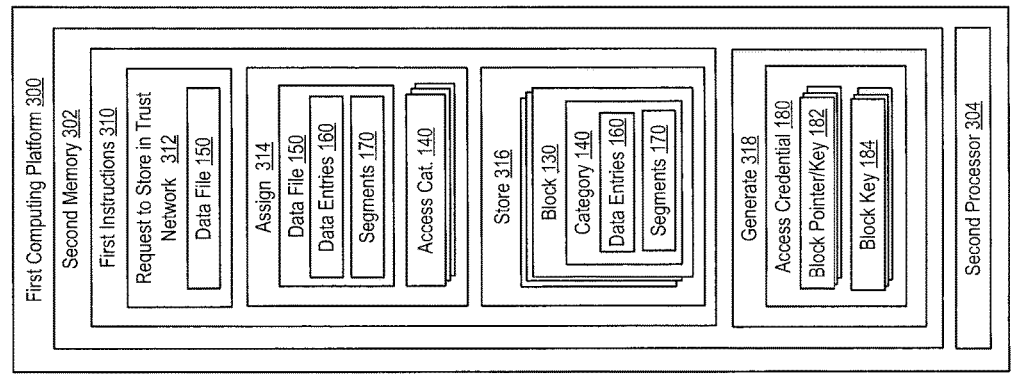
Figure 2:
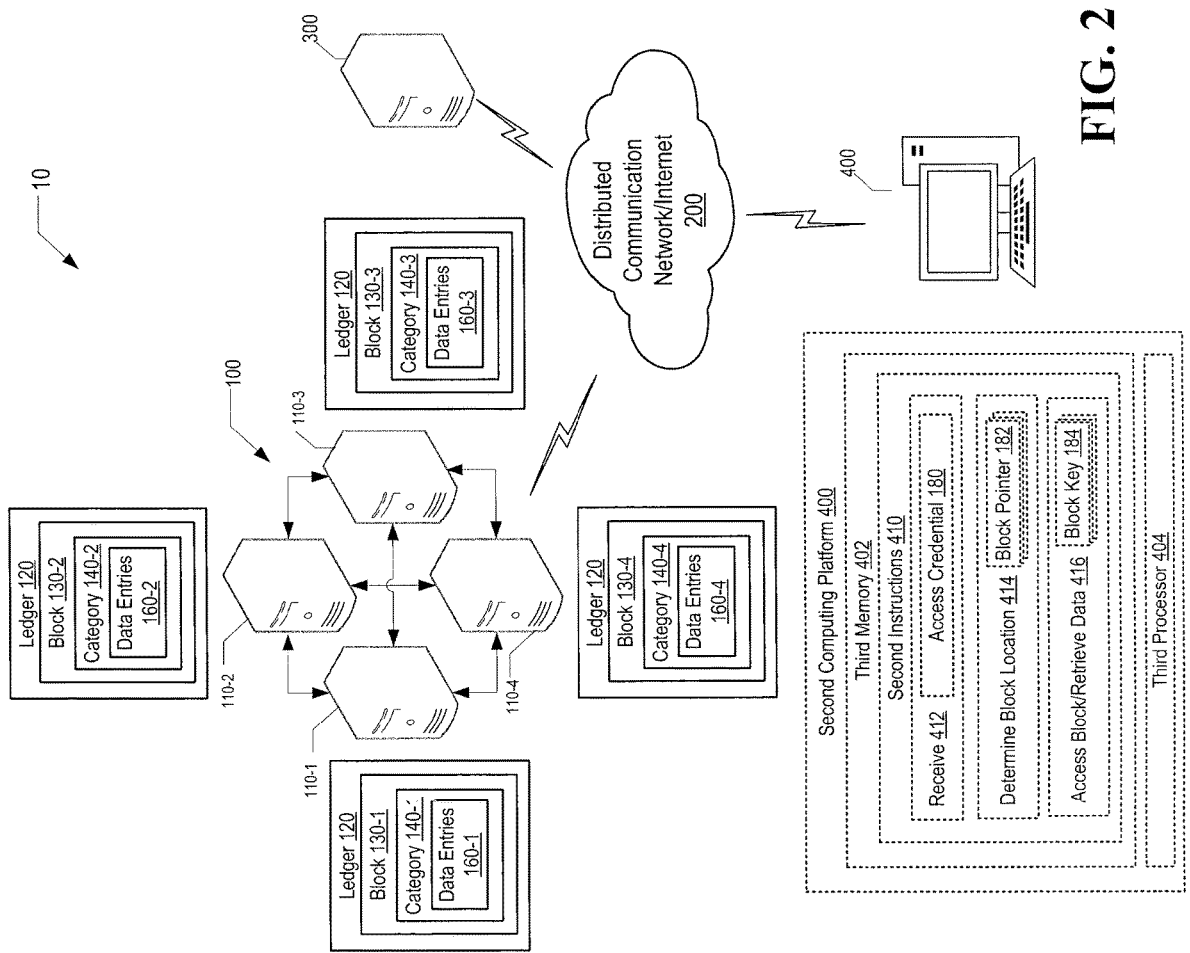
Figure 3:
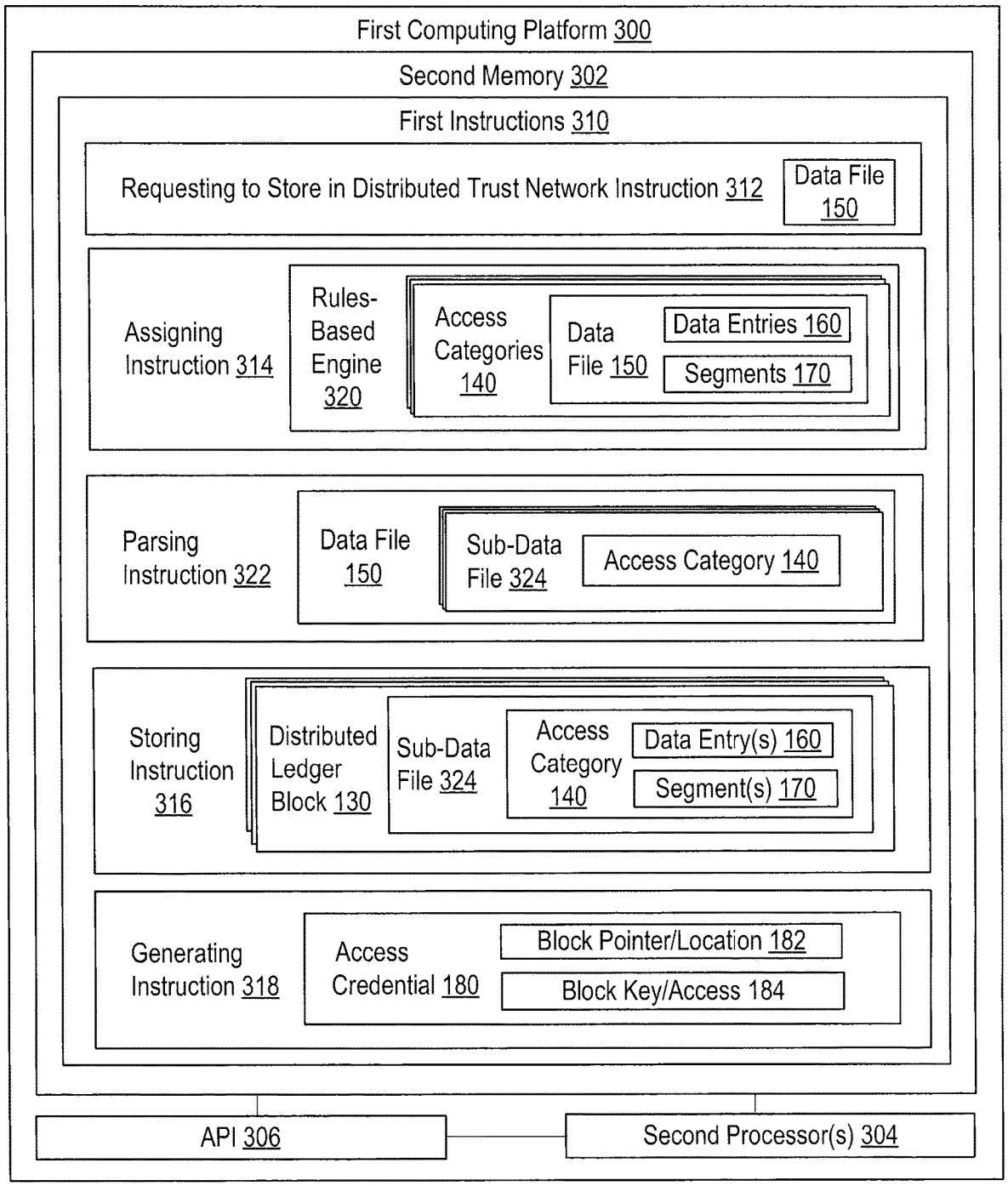
Figure 4:
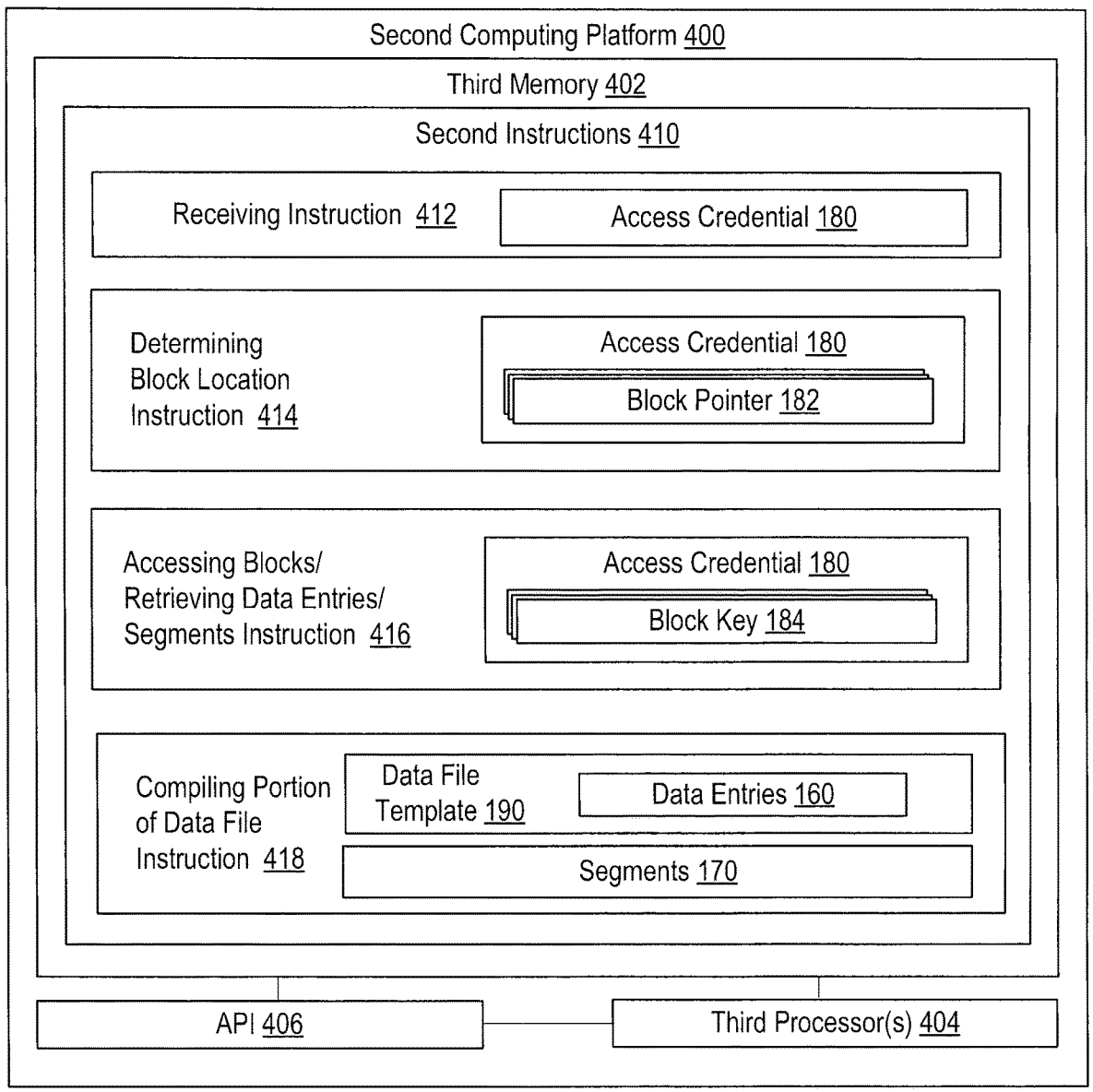
Figure 5:
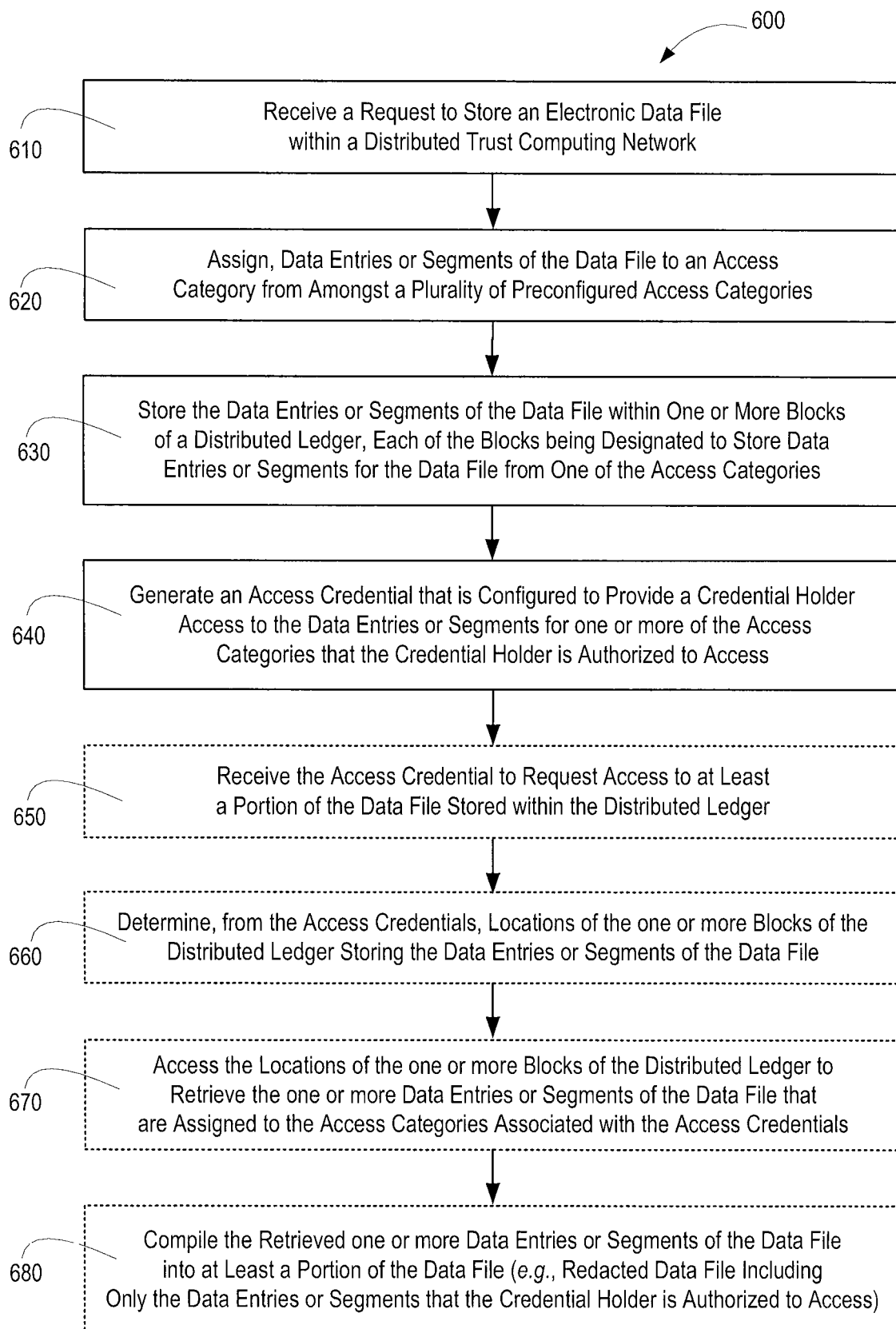

Having thus described embodiments of the disclosure in general terms, reference will now be made to the accompanying drawings, wherein:

FIG. 1 is a schematic diagram of a distributed trust computing network, such as a blockchain network, in accordance with some embodiments of the present disclosure;

FIG. 2 is a schematic diagram of a system for categorizing data in a data file and storing and providing access to categorized data within a distributed trust computing network, in accordance with some embodiments of the present disclosure;

FIG. 3 is a block diagram of a computing platform configured for categorizing data in a data file and storing the categorized data within a distributed trust computing network, in accordance with some embodiments of the present disclosure;

FIG. 4 is a block diagram of a computing platform configured for accessing and retrieving categorized data stored within a distributed trust computing network and compiling the categorized data into a partial data file, in accordance with embodiments of the present invention; and FIG. 5 is a flow diagram of a method for storing and providing a means for accessing to data files within a distributed trust computing network, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for storing data files within a distributed trust computing network, such as a blockchain network, which acts as source of truth for the digital copy and controlling the access to the data files on a per data file segment/data entry basis. As such, the present invention insures that authorized entities that are accessing a distributed trust network for the purpose of verifying/authenticating data contained therein only have access to that portion/segment of the data file (e.g., specific data entries or the like) that they are authorized to access. In other words, the present invention, limits the authorized entity to only accessing data from a data file on a need-to-know basis.

Specifically, the present invention is able to automatically categorize content within a data file for the purpose of granting access to content on a per-category basis. Once the data has been categorized, the present invention provides for storing the data for a data file within a block of the distributed ledger on a per-category or data-entry basis. In this regard, a block of the distributed ledger may store all of the data entries for a predetermined access category or, in alternate embodiments of the invention, a block of the distributed ledger may store a single data entry or a single segment/portion of the data file.

In response to storing the contents of the data file in different blocks of the distributed ledger, the present invention generates access credentials for a specified entity that are configured to grant an entity access to only those portions of the data file that the entity is authorized to access. In this regard, the access credentials are configured to provide pointers to the location of the blocks in the distributed ledger and the keys for accessing the blocks that are associated with categories of data or segments of the data file that the entity is authorized to access.

In response to an authorized accessor presenting the access credentials, the present invention, accesses the blocks of the distributed ledger specified by the access credentials and retrieves the data entries and/or segments of the data file stored in the blocks. In specific embodiments of the invention, the retrieved data entries and/or segments of the data file are returned to the authorized accessor in a raw data file, while in other embodiments of the invention, the retrieved data entries and/or segments of the data file are compiled into a data file format prior to presenting the data entries and/or segments of the data file to the authorized entity. In such embodiments of the invention, compiling the data entries may include retrieving a data file template (e.g., document template) and populating the template with the retrieved data file entries. In this regard, the present invention creates a data file that only includes the data entries that the entity is authorized to access (i.e., a virtual redacted data file/document, in which, data entries that the entity is not authorized to access are either not included or hidden from the entity's view).

Turning now to the figures, FIG. 1 a schematic diagram is provided of an exemplary distributed trust computing network 100 otherwise referred to herein as a blockchain network or "block chain", in accordance with embodiments of the present invention. The distributed trust computing network is a distributed database that maintains, e.g., a list of data records, or the like. In specific embodiments of the invention the data records may include data files (documents, audio files, multimedia files or the like), which a user (data file holder/possessor) desires to store within the trust network as a certified/verified copy of the original data file. The security of the data maintained within the trust network is enhanced by the distributed nature of the network/block chain. The trust network typically includes several nodes 110, which may be one or more systems, machines, computers, databases, data stores or the like operably connected with one another. In some instances, each of the nodes 100 or multiple nodes 100 are maintained by different entities. A trust network typically works without a central repository or single administrator. One well-known application of a trust network/block chain is the public ledger of transactions for cryptocurrencies such as used in bitcoin. The data records recorded in the trust network/block chain are enforced cryptographically and stored on the nodes 100 of the block chain.

A distributed trust network provides numerous advantages over traditional storage networks/databases. A large number of nodes 110 of a trust network may reach a consensus regarding the validity of data maintained with a block of the blockchain, in the context of the present invention data entries or segments of data file maintained on a ledger 120. Additionally, when multiple versions of a data file exist on the ledger 120, multiple nodes 110 can converge on the most up-to-date version of the data file. For example, in the case of a data file, any node 110 within the trust network 100 that stores a record, such as a data file, can determine within a level of certainty whether the record can be authenticated/authorized and become the definitive final verified version of the record by confirming that no conflicting records are confirmed by the trust network/block chain elsewhere.

The distributed trust computing network typically has two primary types of records. The first type is the record type, which consists of the actual data stored in the block chain. The second type is the block type, which are records that confirm when and in what sequence certain events became recorded as part of the blockchain. Records, such as a data file and the events associated therewith are created by participants using the distributed trust computing network in its normal course of business, for example, when a data file is received, a block(s) is created by users known as "miners" who use specialized software/equipment to create blocks. Holders (also, referred to as users) of a block of the blockchain agree to store a data file within the trust network 100 and the related data file records are passed around to various nodes of the block chain. A "valid" data file or related event is one that can be validated based on a set of rules that are defined by the particular system implementing the trust computing network/blockchain. For example, in the case of data files, a valid data file is one that authenticates the user and authorizes entities to access the distributed ledger 120 that stores the data file.

A distributed trust computing network/blockchain 100 is typically decentralized-meaning that a distributed ledger 120 (i.e., a decentralized ledger) is maintained on multiple nodes 110 of the distributed trust computing network/blockchain 100. One node in the distributed trust computing network/blockchain may have a complete or partial copy of the entire ledger 120 or set of records and/or blocks on the trust network/block chain. Events are initiated at a node 110 of a distributed trust computing network/blockchain 100 and communicated to the various nodes 110 of the distributed trust computing network/blockchain 100. Any of the nodes 110 can validate a data file/record or an associated event, add the data file/record or the details of the storage event to its copy of the distributed trust computing network/blockchain 100, and/or broadcast the record or details of the storage event, its associated validation (in the form of a block) and/or other data to other nodes 110. The distributed trust computing network/blockchain 100 shown in FIG. 1 is configured to perform one or more of the steps or functions performed by the system shown in FIG. 2, the computing platform shown in FIGS. 3 and 4 and the methods described by FIG. 5.

Referring to FIG. 2, a block diagram is presented of a system 10 for categorizing data for storage on a distributed computing network and providing access to the categorized data, in accordance with embodiments of the present invention. The system 10 includes a distributed trust computing network 100 as described in relation to FIG. 1. The distributed trust computing network 100 includes a plurality of decentralized nodes 110. Each decentralized node having a first memory (not shown in FIG. 2) and at least one first processor (not shown in FIG. 2) in communication with the first memory. The first memory of the decentralized nodes is configured to store at least a portion of a distributed ledger 120 that includes a plurality of blocks 130. The processors of distributed trust computing network are configured to certify/validate that the blocks 130 of data are authentic and unaltered.

The system additionally includes a first computing platform 300 disposed within a distributed communication network 200, such as the Internet and/or intranets. The first computing platform may comprise one or more computing devices, for example, server, personal computer or the like or, in those embodiments in which at least a portion of the first instructions 310 comprise an mobile application, the computing platform may comprise a portable computing device. The computing platform 300 includes a second memory 302 and at least one second processor 304 in communication with the memory. The second memory includes first instructions 310 that are executable by the first processor 304 and may be executed on one or a plurality of different computing devices.

The first instructions 310 include an instruction 312 configured to request storage of a data file 150 within the distributed trust computing network 100. The data file may be a document/text file, a spreadsheet file, an audio file, a video/multimedia file, a gaming file or any other electronic data file.

The first instructions further include an instruction 314 configured to assign a plurality of the data entries 160 comprising the data file 150 or segments 170 of the data file 150 an access category 140 from amongst a plurality of preconfigured access categories 140. In specific embodiments of the invention the access categories 140 are based on the type of data associated with a data entry, specifically, the security associated with the data in a data entry. For example, categories may comprise a public data category, a non-public data category, a confidential data category, a private data category or the like. In certain specific embodiments of the invention a rules-based engine may be implemented in the determination/assignment of the access categories 140 as a means of determining which access category applies to a preconfigured access category 140. The rules-based engine may rely on keyword pairs as a means of determining which access category 140 applies to a specific data entry. In other embodiments of the invention, specific data files, such as documents, applications/forms, spreadsheet or the like may be preconfigured such that each data entry field has a corresponding access category associated therewith obviating the need to actually determine which access category 140 applies to a specific data entry. As such, it should be noted that assignment of the access categories 140 may be determined after the data file 150 has been received (i.e., after the data file 150 has been requested for storage within the distributed trust computing network 100) or prior to receiving the request to store the data file 150 in the distributed trust computing network 100.

In other embodiments of the invention, in which segments 170 of the data file 150 are assigned access categories 140, the access categories may be based on the length (e.g., duration or number of bytes or the like) of the segments. For example, audio files or multimedia files may have access categories that provide for short segments (e.g., a clip or snippet) of the audio or multimedia file to be isolated. In addition to segment length, the access category may be defined by a starting point and/or ending point within the audio or multimedia file.

Once the access categories have been assigned, the data file may, in specific embodiments of the invention, be parsed into different data file sections/portions according to the access categories and the storage rules for distributed trust computing network 100. For example, in those embodiments of the invention in which all of the data entries within one specific access category will be stored in one specific block 130 of the distributed ledger 120, the data file 140 is parsed into a plurality of data file sections/portions with each section/portion comprising data entries assigned to one specific access category. In other embodiments of the invention in which specific data entry 160 in the data file 150 will be stored in a corresponding separate block 130 of the distributed ledger 120, the data file is parsed into data file sections/portions comprising individual data entries 160.

The first instructions 310 additionally include instructions 316 configured to store, within one or more blocks 130 of the distributed ledger 120, the data entries 160 or segments 170 of the data file 150 assigned to access categories 140. In this regard, the blocks 130 are associated with the data file 150 and the data entries 160 or segments 170 stored therein. As previously discussed, all of the data entries 160 assigned to one access category 140 may be stored within a single block 130 of the distributed ledger 120. Thus, in the illustrated example of FIG. 2, the distributed ledger 120 of the distributed trust computing network 100 stores different blocks 130-1, 130-2, 130-3, 130-4 at different nodes 110-1, 111-2, 110-3, 100-4 with each block comprising data entries 160-1, 160-2, 160-3, 160-4 associated with a respective one of the access categories 140-1, 140-2, 140-3, 140-4. While in other embodiments of the invention, each data entry 160 of data file 150 may be assigned to a corresponding block 130 of the distributed ledger 120 with each of the blocks 130 being associated with the assigned access category 140 of the data entry 160.

First instructions 310 additionally include instructions 318 configured to generate an access credential 180 that is configured to provide a credential holder access to the data entries 160 or segments 180 of the data file 150 stored within the distributed ledger 120 based on one or more of the access categories 140 that the credential holder is authorized to access. The access credential may comprise a username and/or passcode, a physical access credential device, such as key fob with a one-time passcode generator, a barcode/QR code or the like affixed to a copy of document or the like. In specific embodiments of the invention, the access credentials are configured to provide a pointer 182 to the location of the block and an access key 184 for accessing/retrieving data from the block(s) 130 of the distributed ledger 120 associated with the access categories 140 that the access credential holder is authorized to access. In specific embodiments of the invention, access credentials 180 are generated through use of a user-interface that allows a user (i.e., the entity/individual controlling the data file) to select authorized accessors (i.e., credential holder) and assign access categories 140 to the authorized accessors. Once the authorized accessor has been selected and the access categories 140 assigned, the access credentials 180 are generated. In specific embodiments of the invention, in which an authorized accessor is granted access to the entire data file, the access credentials 180 are configured to provide block pointers 182 and block keys 184 to all of the blocks 130 associated with the data file 160 (i.e., blocks 130 associated with all of the access categories 140 and any blocks 130 containing data that has not been placed in an access category). In specific embodiments of the invention, the user-interface may provide for the user to initiate secure (e.g., encrypted, tunnel and/or the like)) electronic communication of the access credential to the selected authorized accessor.

The system 10 additionally includes, in specific optional embodiments of the invention, a second computing platform 400 disposed within the distributed communication network 200, such as the Internet and/or intranets. The second computing platform 400 may comprise one or more computing devices, for example, personal computer, portable computing device, server or the like. The computing platform 400 includes a third memory 402 and at least one third processor 404 in communication with the third memory 402. The third memory 402 includes second instructions 410 that are executable by the second processor 404 and may be executed on one or a plurality of different computing devices.

The second instructions 410 include an instruction 412 configured to receive the access credentials 180 for the purpose of accessing and retrieving at least a portion of the data file 150 (i.e., the portion of the data file that the authorized accessor is authorized to access based on configuration of the access credential 180). In specific embodiments of the invention, the access credentials 180 may be inputted/received at a user-interface configured for receiving the access credentials 180 and subsequently presenting the data entries 160 or segments 170 of the data file 150 to the authorized accessor.

The second instructions 410 additionally include an instruction 414 configured to determine the block locations based on the one or more block pointers 180 associated with the access credential 180. The block pointer 184 may indicate the node 110, the distributed ledger 120 and/or the position of the block 130 within the distributed ledger 120 and the like. Moreover, the second instructions 410 include instructions 416 configured to access the locations of the blocks 130 to retrieve the data entries 160 or segments 170 of the data file 150 associated with the access credentials 180.

Referring to FIG. 3 a block diagram is depicted of the first computing platform 300 configured for categorizing data from a data file to be stored within a distributed ledger of a distributed trust computing network and generating access credentials that provide access to specific access categories of the data file, in accordance with embodiments of the present invention. First computing platform 300, which comprises one or more computing devices (e.g., personal computers, servers or the like), is configured to execute instructions, such as algorithms, modules, routines, applications and the like. First computing platform 300 includes second memory 302, which may comprise volatile and non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, first computing platform 300 also includes at least one second processor 304, which may be an application-specific integrated circuit ("ASIC"), or other chipset, logic circuit, or other data processing device. Second processor 304 may execute one or more application programming interface (APIs) 306 that interfaces with any resident programs, such as first instructions 310 stored in the second memory 302 of the first computing platform 300 and any external programs. Processor 304 may include various processing subsystems (not shown in FIG. 3) embodied in hardware, firmware, software, and combinations thereof, that enable the functionality of first computing platform 300 and the operability of the first computing platform 300 on the distributed computing network 200 (shown in FIG. 2). For example, processing subsystems allow for initiating and maintaining communications and exchanging data with other networked devices. For the disclosed aspects, processing subsystems of second processor 304 may include any subsystem used in conjunction with first instructions 310, and related tools, routines, sub-routines, algorithms, sub-algorithms, sub-modules thereof.

First computing platform 300 may additionally include a communications module (not shown in FIG. 3) embodied in hardware, firmware, software, and combinations thereof, that enables electronic communications between the computing platform 300 and other network devices, such as those shown in FIG. 2. Thus, communication module may include the requisite hardware, firmware, software and/or combinations thereof for establishing and maintaining a network communication connection.

Second memory 302 of first computing platform 300 stores instructions 310 configured to request storage of at least a portion of a data file 150 within the distributed trust computing network 100 (shown in FIG. 2). Storage of the data file within the distributed trust computing network 100 provides a source of truth (i.e., verification) for the data in the data file, such that, authorized accessors of the data from the trust computing network know that they data they access/retrieves is valid, certified, data. The data file may be a document/text file, such as an application/form or the like, a spreadsheet file, an audio file, a video/multimedia file, a gaming file or any other electronic data file.

The first instructions 310 further include an instruction 314 configured to assign a plurality of the data entries 160 comprising the data file 150 or segments 170 of the data file 150 an access category 140 from amongst a plurality of preconfigured access categories 140. In specific embodiments of the invention, all of the data entries 160 or segments 170 of the data file 150 are assigned an access category 140, while in other embodiments of the invention only a portion of the data entries 160 or segments 170 included in the data file 150 are assigned access categories 140. In those embodiments in which only a portion of the data entries 160 or segments 170 in the data file 150 are assigned access categories 140, preconfigured rules may dictate which data entries 160 or segments 170 are to be assigned access categories 140.

In certain specific embodiments of the invention a rules-based engine 320 may be implemented for determining which preconfigured access category 140 applies to data entry 160 or segment 170. The rules-based engine 320 may rely on keyword pairs as a means of determining which access category 140 applies to a specific data entry 160. In other embodiments of the invention, specific data files, such as documents, applications/forms, spreadsheet or the like may be preconfigured such that each data entry field has a corresponding access category 140 associated therewith obviating the need to actually determine which access category 140 applies to a specific data entry 160. As such, it should be noted that assignment of the access categories 140 may be determined after the data file 150 has been received (i.e., after the data file 150 has been requested for storage within the distributed trust computing network 100) or prior to receiving the request to store the data file 150 in the distributed trust computing network 100.

In specific embodiments of the invention the access categories 140 are based on the type of data associated with a data entry, specifically, the type of security or privacy concerns associated with the data in a data entry. For example, categories may comprise a public data category, a non-public data category, a confidential data category, a private data category or the like. In this regard, the present invention is able to insure that authorized accessors are only able to access/retrieve those types of data that they are authorized to access; thus, preventing authorized entities from accessing/retrieving more types of data (e.g., confidential or private date) than they have need and/or right to know.

In other embodiments of the invention, in which segments 170 of the data file 150 are assigned access categories 140, the access categories 140 may be based on the length (e.g., duration or number of bytes or the like) of the segments. For example, audio files or multimedia files may have access categories 140 that provide for different sized segments (e.g., a clip or snippet) of the audio or multimedia file to be isolated. In addition to segment length, the access category 140 may be defined by a starting point and/or ending point within the audio or multimedia file. As such, in specific examples, a specified group of authorized accessors may be provided access to the shortest segments of the audio/multimedia file, while other specified group(s) of authorized accessors may be provided access to the longer segments of the audio/multimedia file or the entire audio/multimedia file.

In optional embodiments of the invention first instructions 310 include instructions 322 configured to parse the data file 150 into different sub-data files 324 according to the access categories 140 and the storage rules for the distributed trust computing network 100. For example, in those embodiments of the invention in which the storage rules dictate that all of the data entries 160 within one specific access category 140 are stored in one specific block 130 of the distributed ledger 120, the data file 140 is parsed into a plurality of sub-data files 324 with each sub-data file 324 comprising data entries 160 assigned to one specific access category 140. In other embodiments of the invention in which the storage rules 140 dictate that each specific data entry 160 in the data file 150 are stored in a corresponding separate block 130 of the distributed ledger 120 (i.e., a one-to-one data entry-to-block storage relationship), the data file 150 is parsed into sub-data files 324 comprising individual data entries 160.

The first instructions 310 additionally include instructions 316 configured to store each sub-data file 324 within a block 130 of the distributed ledger 120. In this regard, the blocks 130 are associated with the data file 150 and a specific access category 140 may store one or a plurality of data entries 160 or segments 170. As previously discussed, all of the data entries 160 assigned to one access category 140 may be stored within a single block 130 of the distributed ledger 120. While in other embodiments of the invention, each data entry 160 of data file 150 may be assigned to a corresponding block 130 of the distributed ledger 120 with each of the blocks 130 being associated with the assigned access category 140 of the data entry 160.

First instructions 310 additionally include instructions 318 configured to generate an access credential 180 that is configured to provide a credential holder (i.e., authorized accessor) access to specific ones of the data entries 160 or segments 180 of the data file 150 stored within the distributed ledger 120 based on one or more of the access categories 140 that the credential holder is authorized to access. The access credential may comprise a username and/or passcode, biometric data, a physical access credential device, such as key fob with a one-time passcode generator, a barcode/QR code or the like affixed to a copy of document or the like. In specific embodiments of the invention, the access credential is configured to provide a pointer 182 to the location of the block 130 within the distributed ledger 120 and an access key 184 for accessing/retrieving data from the block(s) 130 of the distributed ledger 120 associated with the access categories 140 that the access credential holder is authorized to access.

In specific embodiments of the invention, access credential 180 is generated through use of a user-interface that allows a user (i.e., the entity/individual controlling the data file) to select one or more authorized accessors (i.e., credential holders) and assign one or more access categories 140 to the authorized accessors. Once the authorized accessor has been selected and the access categories 140 assigned, the access credentials 180 are generated. In specific embodiments of the invention, in which an authorized accessor is granted access to the entire data file, the access credentials 180 are configured to provide block pointers 182 and block keys 184 to all of the blocks 130 associated with the data file 160 (i.e., blocks 130 associated with all of the access categories 140 and any blocks 130 containing data that has not been placed in an access category 140). In specific embodiments of the invention, the user-interface may provide for the user to initiate secure (e.g., encrypted, tunnel and/or the like)) electronic communication of the access credential to the selected authorized accessor.

Referring to FIG. 4 a block diagram is depicted of the second computing platform 400 configured for accessing categorized data from a distributed ledger stored within a distributed trust computing network and compiling the data into at least a partial copy of the original data file, in accordance with embodiments of the present invention. Second computing platform 400, which comprises one or more computing devices (e.g., portable computing devices, personal computers, servers or the like), is configured to execute instructions, such as algorithms, modules, routines, applications and the like. Second computing platform 400 includes third memory 402, which may comprise volatile and non-volatile memory, such as read-only and/or random-access memory (RAM and ROM), EPROM, EEPROM, flash cards, or any memory common to computing platforms). Moreover, third memory 402 may comprise cloud storage, such as provided by a cloud storage service and/or a cloud connection service.

Further, second computing platform 400 also includes at least one third processor 404, which may be an application-specific integrated circuit ("ASIC"), or other chipset, logic circuit, or other data processing device. Third processor 404 may execute one or more application programming interface (APIs) 406 that interfaces with any resident programs, such as second instructions 410 stored in the third memory 402 of the second computing platform 400 and any external programs. Processor 404 may include various processing subsystems (not shown in FIG. 4) embodied in hardware, firmware, software, and combinations thereof, that enable the functionality of second computing platform 400 and the operability of the second computing platform 400 on the distributed computing network 200 (shown in FIG. 3). For example, processing subsystems allow for initiating and maintaining communications and exchanging data with other networked devices. For the disclosed aspects, processing subsystems of third processor 404 may include any subsystem used in conjunction with second instructions 410, and related tools, routines, sub-routines, algorithms, sub-algorithms, sub-modules thereof.

Second computing platform 400 may additionally include a communications module (not shown in FIG. 4) embodied in hardware, firmware, software, and combinations thereof, that enables electronic communications between the second computing platform 400 and other network devices, such as those shown in FIG. 2. Thus, communication module may include the requisite hardware, firmware, software and/or combinations thereof for establishing and maintaining a network communication connection.

Third memory 402 of second computing platform 400 stores second instructions 410. It should be noted that in other embodiments of the invention, a portion or the entirety of second instructions 410 may be stored in the second memory 302 of first computing platform 300 and/or executed by the second processor(s) 304 of first computing platform 300. Second instructions 410 include The second instructions 410 include an instruction 412 configured to receive the access credentials 180 for the purpose of accessing and retrieving at least a portion of the data file 150 (i.e., the portion of the data file that the authorized accessor is authorized to access based on configuration of the access credential 180). In specific embodiments of the invention, the access credentials 180 may be inputted/received at a user-interface configured for receiving the access credentials 180 and, subsequently, presenting the data entries 160 or segments 170 of the data file 150 to the authorized accessor.

The second instructions 410 additionally include an instruction 414 configured to determine the block locations based on the one or more block pointers 180 associated with the access credential 180. The block pointer 184 may indicate the node 110, the distributed ledger 120 and/or the position of the block 130 within the distributed ledger 120 and the like. Moreover, the second instructions 410 include instructions 416 configured to access the locations of the blocks 130 to retrieve the data entries 160 or segments 170 of the data file 150 (i.e., the sub-data files 324) associated with the access credentials 180.

Additionally, second instructions 410 include instructions 418 configured to compile the retrieved data entries 160 or segments 170. In certain embodiments of the invention, the retrieved data entries 160 or segments 170 are compiled in a raw data file that includes and ma, in some embodiments, be limited to the retrieved data entries 160 or segments 170. In other embodiments of the invention, a data file template 190 is retrieved from a database within the distributed computing network and the retrieved data entries 160 are inserted into the data file template 190 to create a partial data file (i.e., a virtual redacted data file in which only the data entries that the authorized accessor is authorized to access appear in the data file), which is subsequently communicated/presented to the authorized accessor. In those embodiments of the invention in which the segments 170 retrieved the segments may be compiled in the order they appear in the data file 150 to create a seamless partial or total data file 150.

Referring to FIG. 5 a flow diagram is presented of a method 600 for categorizing data from a data file to be stored within a distributed ledger of a distributed trust computing network, generating an access credential that provide access to specific access categories of the data file and, in optional embodiments, presenting the access credential to retrieve the portion of the data file that the credential holder is authorized to access, in accordance with embodiments of the present invention.

At Event 610, a request is received to store at least a portion of an electronic data file within the distributed trust computing network. As previously discussed, storage of the data file within the distributed trust computing network provides a source of truth (i.e., verification) for the data in the data file, such that, authorized accessors of the data from the trust computing network know that they data they access/retrieves is valid, certified, data. The data file may be a document/text file, such as an application/form or the like, a spreadsheet file, an audio file, a video/multimedia file, a gaming file or any other electronic data file.

At Event 620, a plurality of the data entries comprising the data file or segments of the data file are assigned to an access category from amongst a plurality of preconfigured access categories. In specific embodiments of the invention, all of the data entries or segments of the data file are assigned an access category, while in other embodiments of the invention only a portion of the data entries or segments included in the data file are assigned access categories. In those embodiments in which only a portion of the data entries or segments in the data file are assigned access categories, preconfigured rules may dictate which data entries or segments are to be assigned access categories. In certain specific embodiments of the invention a rules-based engine may be implemented for assigning preconfigured access category to data entries or segments. The rules-based engine may rely on keyword pairs as a means of determining which access category to assign to a specific data entry. In other embodiments of the invention, specific data files, such as documents, applications/forms, spreadsheet or the like may be preconfigured such that each data entry field has a corresponding access category associated therewith obviating the need to actually determine which access category to assign to a specific data entry. As previously discussed, the access categories may be based on the type of data associated with a data entry, specifically, the type of security or privacy concerns associated with the data in a data entry. For example, categories may comprise a public data category, a non-public data category, a confidential data category, a private data category or the like. In this regard, the present invention is able to insure that authorized accessors are only able to access/retrieve those types of data that they are authorized to access; thus, preventing authorized entities from accessing/retrieving more types of data (e.g., confidential or private date) than they have need and/or right to know.

In optional embodiments of the method (not depicted in FIG. 5) the data file is parsed into different sub-data files according to the access categories and the storage rules for the distributed trust computing network. For example, in those embodiments of the invention in which the storage rules dictate that all of the data entries within one specific access category are stored in one specific block of the distributed ledger, the data file is parsed into a plurality of sub-data files with each sub-data file comprising data entries assigned to one specific access category. In other embodiments of the invention in which the storage rules dictate that each specific data entry in the data file is stored in a corresponding separate block of the distributed ledger, the data file is parsed into sub-data files comprising individual data entries.

At Event 630, the data entries or segments assigned to access categories are stored within blocks of the distributed ledger. In this regard, the blocks are associated with the data file and a specific access category, which may store one or a plurality of data entries or segments. As previously discussed, all of the data entries assigned to one access category may be stored within a single block of the distributed ledger. While in other embodiments of the invention, each data entry of data file is assigned to a corresponding block of the distributed ledger with each of the blocks being associated with the assigned access category of the data entry.

At Event 640 an access credential is generated that is configured to provide a credential holder (i.e., authorized accessor) access to specific ones of the data entries or segments of the data file stored within the distributed ledger based on one or more of the access categories that the credential holder is authorized to access. The access credential may comprise a username and/or passcode, biometric data, a physical access credential device, such as key fob with a one-time passcode generator, a barcode/QR code or the like affixed to a copy of document or the like. In specific embodiments of the invention, the access credential is configured to provide a pointer to the location of the block within the distributed ledger and an access key for accessing/retrieving data from the block(s) of the distributed ledger associated with the access categories that the access credential holder is authorized to access.

At optional Event 650, the access credentials are received for the purpose of accessing and retrieving at least a portion of the data file (i.e., the portion of the data file that the authorized accessor is authorized to access based on configuration of the access credential).

At optional Event 660, the block locations are determined based on the one or more block pointers associated with the access credential. The block pointer may indicate the node, the distributed ledger and/or the position of the block within the distributed ledger and the like. At optional Event 670, the locations of the blocks are accessed and the data entries or segments of the data file (i.e., the sub-data files) associated with the access credentials are retrieved.

At optional Event 680, the retrieved data entries or segments compiled. In certain embodiments of the invention, the retrieved data entries or segments are compiled in a raw data file that includes and may, in some embodiments, be limited to the retrieved data entries or segments. In other embodiments of the invention, a data file template is retrieved from a database within the distributed computing network and the retrieved data entries are inserted into the data file template to create a partial data file (i.e., a virtual redacted data file in which only the data entries that the authorized accessor is authorized to access appear in the data file), which is subsequently communicated/presented to the authorized accessor.

Thus, present embodiments of the invention providing systems, methods, computer program product and/or the like provide for automatically categorize content within a data file for the purpose of granting access to content on a per-category basis. Once the data has been categorized, the present invention provides for storing the data for a given data file within a block of the distributed ledger on a per-category or data-entry basis. In this regard, a block of the distributed ledger may store all of the data entries for a predetermined access category or, in alternate embodiments of the invention, a block of the distributed ledger may store a single data entry or a single segment/portion of the data file. In response to storing the contents of the data file in different blocks of the distributed ledger, the present invention generates access credentials for a specified entity that are configured to grant an entity access to only those portions of the data file that the entity is authorized to access. In this regard, the access credentials are configured to provide pointers to the location of the blocks in the distributed ledger and the keys for accessing the blocks that are associated with categories of data or segments of the data file that the entity is authorized to access.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing access to data stored in a distributed trust computing network, the system comprising:
a distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks that store data, wherein the distributed trust computing network is configured to certify that the data stored in the blocks is authentic and unaltered; and
a first computing platform disposed in a distributed computing network and including a second memory and at least one second processor in communication with the second memory, wherein the second memory stores first instructions that are executable by the second processor and configured to:
receive a request to store an electronic data file within the distributed trust computing network,
assign, one or more (i) data entries or (ii) segments of the data file, an access category from amongst a plurality of preconfigured access categories, wherein the preconfigured access categories are defined by different levels of security required of the data entries or segments assigned to the access category;
store the one or more (i) data entries or (ii) segments of the data file within one or more of the blocks of the distributed ledgers, wherein each of the one or more blocks are designated to store (i) data entries or (ii) segments from one of the access categories, and
generate an access credential that is configured to provide a credential holder access to one or more of the (i) data entries or (ii) segments of the data file stored within the distributed ledger based on one or more of the access categories that the credential holder is authorized to access.

2. The system of claim 1, wherein the first instructions are further configured to store each of the one or the one or more (i) data entries or (ii) segments of the data file assigned to one of the plurality of preconfigured access categories within one data file-specific and access category-specific block of the distributed ledger.

3. The system of claim 2, wherein the first instructions are further configured to generate the access credentials that are configured to include a pointer that identifies a location within the distributed ledger of each data file-specific and access category-specific block of the distributer ledger that is associated with (i) the data file and (ii) an access category that the credential holder is authorized to access.

4. The system of claim 1, wherein the first instructions are further configured to store each of the one or the one or more (i) data entries or (ii) segments of the data file in a data file-specific and data entry-specific or segment-specific block of the distributed ledger.

5. The system of claim 4, wherein the first instructions are further configured to generate the access credentials that are configured to include a pointer that identifies a location within the distributed ledger of each of the data file-file specific and data entry-specific or segment-specific blocks of the distributer ledger that are associated with (i) the data file, and (ii) an access category that the credential holder is authorized to access.

6. The system of claim 1, wherein the second memory of the first computing platform stores second instructions that are executable by the second processor and configured to:
receive the access credentials for accessing at least a portion of the data file stored within the distributed ledger,
determine, from the access credentials, locations of one or more of the blocks of the distributed ledger that store one or one or more (i) data entries or (ii) segments of the data file that are assigned to one or more of the plurality of preconfigured access categories associated with the access credentials, and
access the locations of the one or more blocks of the distributed ledger to retrieve the one or more (i) data entries or (ii) segments of the data file that are assigned to one or more of the plurality of preconfigured access categories associated with the access credentials.

7. The system of claim 6, wherein the second instructions are further configured to:
compile the retrieved one or more (i) data entries or (ii) segments of the data file into at least a portion of the data file.

8. The system of claim 6, wherein the second instructions are further configured to:
compile the retrieved one or more data entries of the data file into at least a portion of the data file, wherein the least a portion of the data file comprises a redacted data file including only the data entries that the credential holder is authorized to access.

9. A computer-implemented method for providing access to data stored in a distributed trust computing network, said distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks that store data, wherein the distributed trust computing network is configured to certify that the data stored in the blocks is authentic and unaltered, and wherein the computer-implemented method is implemented by one or more second processing devices and comprising:
   receiving a request to store an electronic data file within the distributed trust computing network;
   assigning, one or more (i) data entries or (ii) segments of the data file, an access category from amongst a plurality of preconfigured access categories, wherein the preconfigured access categories are defined by different levels of security required of the data entries or segments assigned to the access category;
   storing the one or more (i) data entries or (ii) segments of the data file within one or more of the blocks of the distributed ledgers, wherein each of the one or more blocks are designated to store (i) data entries or (ii) segments from one of the access categories; and
   generating an access credential that is configured to provide a credential holder access to one or more of the (i) data entries or (ii) segments of the data file stored within the distributed ledger based on one or more of the access categories that the credential holder is authorized to access.

10. The computer-implemented method of claim 9, wherein storing further comprises storing each of the one or the one or more (i) data entries or (ii) segments of the data file assigned to one of the plurality of preconfigured access categories within one data file-specific and access category-specific block of the distributed ledger.

11. The computer-implemented of claim 10, wherein generating further comprises generating the access credentials that are configured to include a pointer that identifies a location within the distributed ledger of each data file-specific and access category-specific block of the distributer ledger that is associated with (i) the data file and (ii) an access category that the credential holder is authorized to access.

12. The computer-implemented method of claim 9, further comprising:
   receiving the access credentials for accessing at least a portion of the data file stored within the distributed ledger;
   determining, from the access credentials, locations of one or more of the blocks of the distributed ledger that store one or one or more (i) data entries or (ii) segments of the data file that are assigned to one or more of the plurality of preconfigured access categories associated with the access credentials; and
   accessing the locations of the one or more blocks of the distributed ledger to retrieve the one or more (i) data entries or (ii) segments of the data file that are assigned to one or more of the plurality of preconfigured access categories associated with the access credentials.

13. The computer-implemented method of claim 12, further comprising:
   compiling the retrieved one or more (i) data entries or (ii) segments of the data file into at least a portion of the data file.

14. The computer-implemented method of claim 13, wherein compiling further comprises compiling the retrieved one or more data entries of the data file into at least a portion of the data file, wherein the least a portion of the data file comprises a redacted data file including only the data entries that the credential holder is authorized to access.

15. A computer program product for providing access to data stored in a distributed trust computing network, said distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks that store data, wherein the distributed trust computing network is configured to certify that the data stored in the blocks is authentic and unaltered, said computer program product comprising computer software code stored on a non-transitory computer-readable medium, said computer program code comprising:
   a first set of codes for causing a computer to receive a request to store an electronic data file within the distributed trust computing network;
   a second set of codes for causing a computer to assign, one or more (i) data entries or (ii) segments of the data file, an access category from amongst a plurality of preconfigured access categories, wherein the preconfigured access categories are defined by different levels of security required of the data entries or segments assigned to the access category;
   a third set of codes for causing a computer to store the one or more (i) data entries or (ii) segments of the data file within one or more of the blocks of the distributed ledgers, wherein each of the one or more blocks are designated to store (i) data entries or (ii) segments from one of the access categories; and
   a fourth set of codes for causing a computer to generate an access credential that is configured to provide a credential holder access to one or more of the (i) data entries or (ii) segments of the data file stored within the distributed ledger based on one or more of the access categories that the credential holder is authorized to access.

16. The computer program product of claim 15, wherein the third set of codes is further configured to cause the computer to store each of the one or the one or more (i) data entries or (ii) segments of the data file assigned to one of the plurality of preconfigured access categories within one data file-specific and access category-specific block of the distributed ledger and the fourth set of codes is further configured to cause the computer to generate the access credentials that are configured to include a pointer that identifies a location within the distributed ledger of each data file-specific and access category-specific block of the distributer ledger that is associated with (i) the data file and (ii) an access category that the credential holder is authorized to access.

17. The computer program product of claim 15, further comprising:
   a fifth set of codes for causing a computer to receive the access credentials for accessing at least a portion of the data file stored within the distributed ledger;
   a sixth set of codes for causing a computer to determine, from the access credentials, locations of one or more of the blocks of the distributed ledger that store one or one or more (i) data entries or (ii) segments of the data file that are assigned to one or more of the plurality of preconfigured access categories associated with the access credentials;

a seventh set of codes for causing a computer to access the locations of the one or more blocks of the distributed ledger to retrieve the one or more (i) data entries or (ii) segments of the data file that are assigned to one or more of the plurality of preconfigured access categories associated with the access credentials; and an eighth set of codes for causing a computer to compile the retrieved one or more (i) data entries or (ii) segments of the data file into at least a portion of the data file.

18. The computer program product of claim 17, wherein the eighth set of codes is further configured to compile the retrieved one or more data entries of the data file into at least a portion of the data file, wherein the least a portion of the data file comprises a redacted data file including only the data entries that the credential holder is authorized to access.

\* \* \* \* \*